May 20, 1952  C. J. DAVIS, JR  2,597,230
TREATMENT OF TANK WATER AND TANKAGE
Filed May 4, 1948
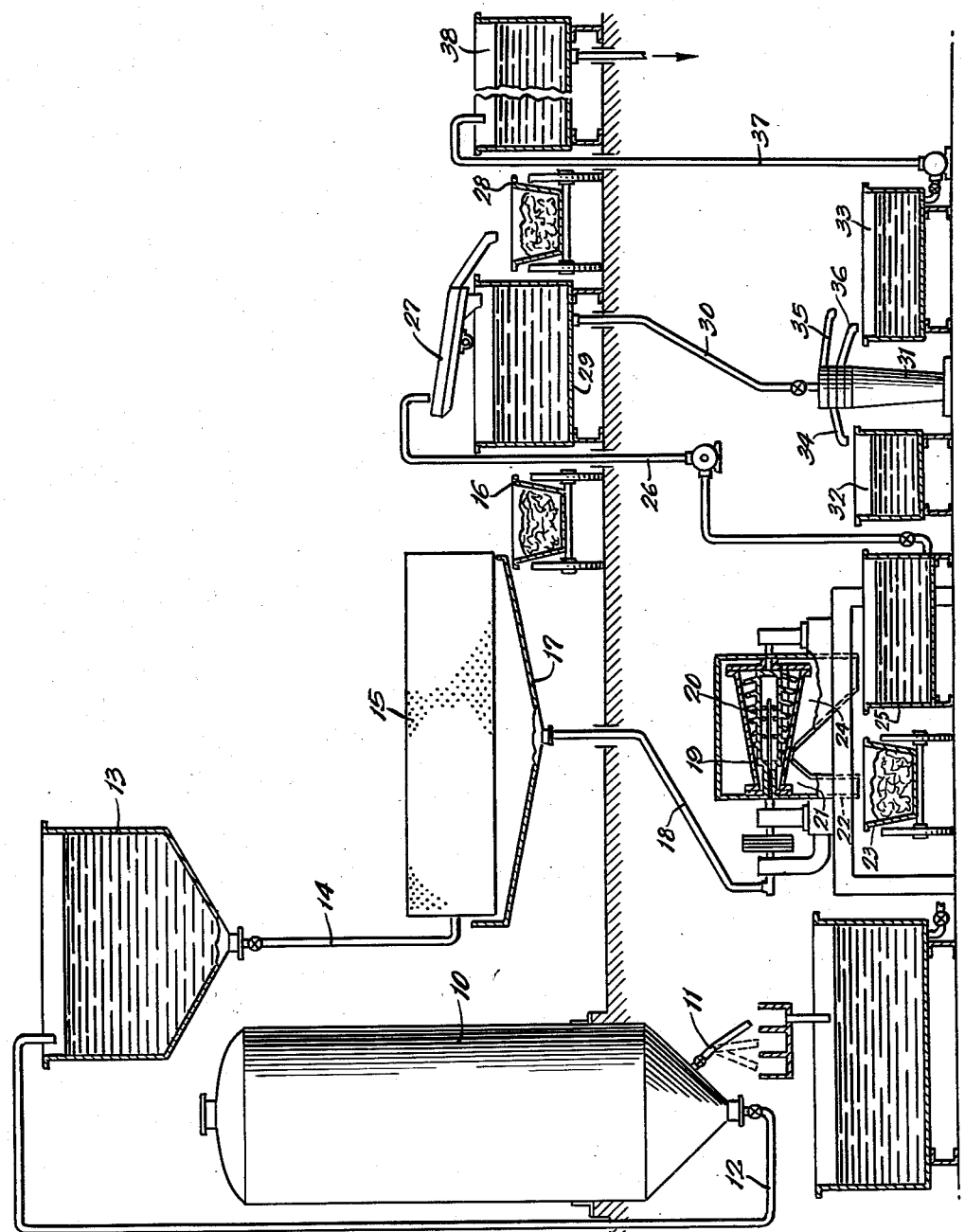
Inventor:
Charles J. Davis Jr.,
By Carl C. Batz
Attorney.

Patented May 20, 1952

2,597,230

UNITED STATES PATENT OFFICE 2,597,230

TREATMENT OF TANK WATER AND TANKAGE

Charles J. Davis, Jr., Chicago, Ill., assignor to Armour and Company, Chicago, Ill., a corporation of Illinois Application May 4, 1948, Serial No. 24,937

9 Claims. (Cl. 260—412.5)

1

This invention relates to a tank water treating process. The invention is particularly useful in the treating of wet rendered tankage and tank water, etc.

In the present practice for the treatment of animal fatty material, the material is placed in a treating tank and cooked under pressure to reduce it to fat, floaters, tank water, and tankage. Upon completion of the cooking, the steam is shut off and the cooked stock is allowed to settle into an upper stratum of fat, a next lower stratum of floaters, a next lower stratum of tank water, and a bottom stratum of tankage. The fat and floaters are drawn off, and thereafter the tank water and tankage are blown off to a settling tank and resettled. Fat rising to the top of this mixture, is skimmed off and rendered with the floaters. The tankage is pressed, and the liquid stick evaporated to produce a concentrated stick that is then mixed with the pressed solids. The pressed solids are in the form of a hard cake, and with its high content of grease, it is extremely difficult to mix stick water with this material in order to raise the protein content. As a result, a substantial volume of dried blood has to be added to the material in order to raise the protein content sufficiently high to make the product satisfactory as a fertilizer. At the same time, the material contains from 11 to 16% of grease, and this represents a heavy loss not only because of the high value of the grease itself, but also because it is an undesirable component of the fertilizer product in which it prevents the absorption of stick water. A further disadvantage is that, in the pressing operations, considerable drippage occurs which tends to cover the floors and equipment in the separation rooms, and such material is not only injurious to the skin, but also makes the operation of the equipment in such rooms difficult and unpleasant.

An object of the present invention is to provide a process in which a greatly increased amount of grease is recovered from the wet rendered tankage and tank water, while at the same time solids are recovered in condition for absorption in much larger proportions of concentrated stick water. Yet another object is to provide a process for the treating of wet rendered tankage and tank water, in which solids are separated with a minimum of grease clinging thereto, while at the same time increasing the recovery of grease. Yet another object is to provide a process in which solids are continuously separated from an emulsified grease and water mixture while withdrawing a minimum amount of grease and in which the recovered solids are in such form as to absorb the concentrated stick water, thus obviating the necessity of adding blood or other proteins. A further object is to provide a process in which drippage and the contamination of the floors of the separating rooms is obviated while increasing the net gain of grease or fats. Other specific objects and advantages will appear as the specification proceeds.

The process may be carried out in any suitable apparatus. One form of apparatus suitable for use with the invention is illustrated in the accompanying drawing, in which the apparatus is shown diagrammatically and partly in section.

In the illustration given, 10 designates a tank in which the fatty material is cooked in the usual manner and in which separations are made in accordance with the usual practice. Material is drawn off through swing pipe 11 into receptacles indicated. The tank water and tankage is blown off through pipe 12 to the skimmer tank 13. Fat from the top of the mixture in tank 13 is skimmed off and recovered.

Wet rendered tankage and tank water is withdrawn from tank 13 through pipe 14 and passed through a coarse screen 15, which is employed to remove large pieces of bone and tankage. The bone and coarse tankage is recovered in the vessel 16 from the lower end of the screen 15, which may be kept in rotation.

The screened tankage and tank water is recovered within the apron 17 and is passed through pipe 18 to an emulsifying device. If desired, emulsification may be carried on in any type of vessel equipped with agitators and in which sufficient turbulence is maintained to bring the grease and water into an effective emulsion.

I have found that emulsification can be effectively brought about in a continuous separator in which solids are at the same time separated from the emulsified grease and water. In the illustration given, the mixture from pipe 18 is passed into the rotating cylinder 19 of a separating device, the cylinder being tapered so as to present an inclined bottom wall. Within the casing 19 is a screw propeller 20 which is driven so as to move the solids upwardly along the inclined perforated wall toward the solids outlet 21. The solids fall downwardly through the chute 22 into the vessel 23. The liquid portion, containing the emulsion and solubles, passes through the screen into the receiver 24 and is directed into tank 25. In view of the fact that the type of separator indicated is well known in the art, a more detailed description is believed unnecessary. It is sufficient to say that the rotation of the screw member 20 and the rotation of the cylinder 19 cooperate in churning the material to produce an effective emulsion between the grease and water, while at the same time solids are separated from the emulsion.

In the removal of solids from the tank water prior to the emulsification step, it is found that the grease is strongly adherent to the solids and that the separation of the solids requires also the removal of relatively large percentages of grease adhering thereto.

On the other hand, after the water and grease are emulsified, it is found that the emulsified material does not retain the marked quality of adherence characteristic of the grease, and when the solids are separated, there is a tendency for the emulsion to flow away from the solids and to be recovered separately.

The solids separated from the emulsion are found to be fluffy and light in character and to contain a lesser amount of grease. The reduction in the grease content, which is repellent to stick water, and also the fluffy character of the solids enables the solids to absorb a large amount of stick water.

The emulsified material recovered in tank 25 may be pumped through pipe 26 into a shaker sieve 27 to remove solid particles which are received within the tank 28. The emulsion passes into tank 29, and from thence flows through pipe 30 into a separator 31. The centrifuge 31 breaks the emulsion, discharging grease into the vessel 32 and water and solids into tank 33. In the specific illustration given, the centrifuge is of a well-known type, which provided a three-way separation, discharging grease through pipe 34, solids through pipe 35, and water through pipe 36. The pipes 35 and 36 discharge into the same tank, and it will be understood that any separator which brings together the solids and water, while removing the grease through another outlet, may be employed. The water containing soluble material is pumped from tank 33 through pipe 37 into a storage tank 38 or, preferably, to evaporators for concentration. The stick water from tank 38 or from the evaporators is then brought into contact with the solids from vessel 23 so as to incorporate the concentrated stick water with the solids.

The solids from vessel 23 and the concentrated stick water are readily mixed, and a large volume of the concentrated stick water containing the solubles is absorbed by the solids. The resulting product is thus made rich in protein by the concentrated stick water, and it is not necessary to add blood or other protein materials. The recovery of grease in vessel 32 represents a large saving. Not only does such grease represent a net saving, but also the removal of such grease from the solids recovered in vessel 23 greatly improves the product and enables it to absorb the concentrated stick water, as already described.

As a specific example, the following may be set out: Wet rendered tankage and tank water from tank 13 was passed into rotating screen 15 to remove bone and coarse tankage. Such material received in vessel 16 was found to have a grease content of 5.9% when dried to an 8% moisture basis, and to constitute 16½% of the total tankage. The material passing through the screen and removed through pipe 18 was emulsified in the continuous separator, the emulsified material passing to tank 25. The solids were recovered through pipe 22 and received in vessel 23. The grease content of the material received in vessel 23 was found to be about 6.7% when dried to an 8% moisture basis, and constituted 83½% of the tankage material. The average grease content on an 8% moisture basis of the solids removed by the rotating screen and continuous separator was 6.56%. This material was fluffy and light and highly absorbent of stick water. The emulsion was passed through a separator and thence into a centrifuge which broke down the emulsion into grease, which was received in one vessel, and water containing solubles and solids into another vessel. The water content of solubles and solids was withdrawn from tank 33 and concentrated. It was found that all the concentrated stick water was taken up by the solids from vessel 23. No losses from drippage occurred in the separating room and the floors and equipment were as clean as when the operations started.

The comparable grease content of tankage solids pressed by the conventional hydraulic press generally used for this purpose is from 12% to 15%. Thus the above example demonstrates a saving of about 7%, or more than half of the grease which heretofore has been discarded.

The new process is a continuous process and is effective for treating the material as it comes from the rendering tank, whereas, under the prior practice, from 24 to 48 hours were required to effect a partial separation by holding the material in tanks. The new process eliminates hand skimming and the long periods of settling heretofore required. Further, the new process eliminates the large loss of fine solids which heretofore has occurred through drippage in the use of the mechanical presses. In addition, the improved process effects a saving of at least 50% in time and labor.

Throughout the separating operations described, i. e., through the emulsifying, solid separation, emulsion breaking and separating steps, etc., I prefer to maintain a temperature of about 160–190° F. In the specific example given, the temperature was about 180° F., and this temperature was very satisfactory. The operating temperatures in my process, however, are not especially critical since they are merely those which are conventional in the treatment of tank water and tankage. It is obviously advisable though to maintain temperatures at least above the liquifying temperature of the fats.

In the preferred process illustrated in which centrifuges are used for continuously separating the solids from the emulsion and for breaking up the emulsion into constituent parts, it will be understood that these functions may be accomplished by other forms of apparatus. Further, under certain conditions, it may be desirable to omit some of the screening operations described and shown as preceding the centrifuging steps. It will be sufficient after the emulsification of the grease and water is accomplished in any suitable vessel, to remove the intense adherent quality of the grease and permit the separation of the solids from the emulsion with a relatively low grease content.

While in the foregoing specification, I have set forth certain steps in considerable detail and have specified certain apparatus as suitable for the carrying out of the process, it will be understood that the details of such steps and apparatus may be varied widely by those skilled in the art without departing from the spirit of my invention.

I claim:

1. In a method for treating wet rendered tankage and tank water in which solids in the water are coated with grease, for the separation of solids, grease and water containing solubles, the steps of emulsifying the water and grease, separating solids from the emulsion, and separating the emulsion into grease and water constituents, said water containing solubles.

2. In a method for treating wet rendered tankage and tank water in which the tankage solids in the water are coated with grease, for the separation of solids, grease and water, the steps of continuously emulsifying a water and grease stream, continuously removing solids from the emulsion, and breaking down the emulsion into grease and water.

3. In a method for treating wet rendered tankage and tank water in which the tankage solids in the water are coated with grease, for the separation of solids, grease and water containing solubles, the steps of emulsifying the water and grease to form an emulsion less adherent to solids, separating solids from the emulsion, and centrifuging the emulsion to break down the same into grease and water constituents, said water containing solubles.

4. In a method for treating wet rendered tankage and tank water for the separation of solids, grease and water containing solubles, the steps of emulsifying the water and grease, separating solids from the emulsion, separating the emulsion into grease and water constituents, the water containing said solubles, and mixing said water and solubles with said solids.

5. In a method for treating wet rendered tankage and tank water for the separation of solids, grease and water containing solubles, the steps of emulsifying the water and grease, separating solids from the emulsion, separating the emulsion into grease and water constituents, concentrating the separated water with its solubles, and mixing the concentrated material with said solids.

6. In a method for treating wet rendered tankage and tank water for the separation of solids, grease and water containing solubles and solids, the steps of emulsifying the water and grease, separating solids from the emulsion, separating the emulsion into grease and water constituents, said water containing solubles and protein solids, concentrating the separated solubles and protein solids in the separated water, and mixing the concentrated material with said first-mentioned solids.

7. In a method for treating wet rendered tankage and tank water in which solids in the water are coated with grease, for the separation of solids, grease and water, the step of continuously emulsifying the water and grease while separating solids from the emulsion.

8. In a method for treating wet rendered tankage and tank water in which the tankage solids are coated with grease, for the separation of solids, grease and water, the steps of emulsifying the water and grease, separating solids from the emulsion, and separating the emulsion into grease and water constituents while maintaining the material in said separating operations at a temperature of about 160–190° F.

9. In a method for treating wet rendered tankage and tank water in which the tankage solids are coated with grease, for the separation of solids, grease and water, the steps of emulsifying the water and grease, separating solids from the emulsion, and separating the emulsion into grease and water constituents while maintaining the material in said separating operations at a temperature of about 180° F.

CHARLES J. DAVIS, Jr.

REFERENCES CITED

The following references are of record in the file of this patent:

UNITED STATES PATENTS

| Number | Name | Date |
| --- | --- | --- |
| 1,023,386 | Merrill | Apr. 16, 1912 |
| 1,711,482 | Grossman | Apr. 30, 1929 |
| 1,764,390 | Cleary | June 17, 1930 |
| 1,770,736 | Funk | July 15, 1930 |
| 2,037,218 | Empson | Apr. 14, 1936 |
| 2,193,871 | Hanno | Mar. 19, 1940 |
| 2,236,895 | Court | Apr. 1, 1941 |
| 2,252,959 | Blair, Jr. | Aug. 19, 1941 |
| 2,281,609 | Walter | May 5, 1942 |
| 2,368,028 | Kernot et al. | Jan. 23, 1945 |